(12) United States Patent
Gibbs

(10) Patent No.: US 8,287,141 B2
(45) Date of Patent: Oct. 16, 2012

(54) ADJUSTABLE, ANTI-GLARE AUTOMOBILE SIDE MIRROR

(76) Inventor: John M. Gibbs, Crozet, VA (US)

( * ) Notice: Subject to any disclaimer, the term of this patent is extended or adjusted under 35 U.S.C. 154(b) by 804 days.

(21) Appl. No.: 12/143,887

(22) Filed: Jun. 23, 2008

(65) Prior Publication Data
US 2009/0316272 A1 Dec. 24, 2009

(51) Int. Cl.
*G02B 5/08* (2006.01)
(52) U.S. Cl. ......... 359/606; 359/605; 359/843; 359/877
(58) Field of Classification Search .................. 359/606
See application file for complete search history.

(56) References Cited

U.S. PATENT DOCUMENTS

| 3,601,614 | A | * | 8/1971 | Platzer .................... 250/214 AL |
| 3,680,951 | A | * | 8/1972 | Jordan et al. .................. 359/606 |
| 3,722,984 | A | * | 3/1973 | Brean ............................ 359/605 |
| 3,839,663 | A | * | 10/1974 | Brean et al. ................... 318/480 |
| 4,626,084 | A | | 12/1986 | Kumai |
| 5,343,333 | A | | 8/1994 | Nagayama et al. |
| 5,475,366 | A | * | 12/1995 | Van Lente et al. ............ 340/525 |
| 5,838,505 | A | * | 11/1998 | Palathingal .................... 359/839 |
| 5,993,013 | A | | 11/1999 | Greiner |
| 2001/0033438 | A1 | * | 10/2001 | Kling et al. .................... 359/877 |
| 2004/0143380 | A1 | * | 7/2004 | Stam et al. ...................... 701/36 |

FOREIGN PATENT DOCUMENTS

WO WO 03099614 A1 * 12/2003
* cited by examiner

*Primary Examiner* — Arnel C Lavarias
(74) *Attorney, Agent, or Firm* — Dale J. Ream

(57) ABSTRACT

An automobile side mirror includes a reflective portion having a front mirror that is incompletely silvered and a rear mirror angularly offset from the front mirror, the rear mirror being fixed relative to the front mirror. The mirror includes a bracket hingedly coupled to the reflective portion and a solenoid hingedly coupled to the reflective portion to selectively move the reflective portion from a first configuration to a second configuration. The mirror includes a return element to return the reflective portion from the second configuration to the first configuration. A light sensor is positioned to detect an amount of light directed toward the reflective portion. A processor is in communication with the light sensor and in communication with the solenoid, the processor including programming to actuate the solenoid upon detection of a predetermined amount of light directed at the light sensor.

3 Claims, 5 Drawing Sheets

ADJUSTABLE, ANTI-GLARE AUTOMOBILE SIDE MIRROR

BACKGROUND OF THE INVENTION

This invention relates generally to automobile mirrors and, more particularly, an automobile side mirror that is both manually and automatically adjustable to avoid a glare from the lights of a trailing vehicle.

A difficult and even dangerous driving condition during night driving is the glare experienced from the lights of an oncoming vehicle or from the lights of a trailing vehicle. Specifically, the glare of lights in the rear view or side view mirror caused by a vehicle approaching from the rear can be bothersome to a driver. While a driver may manually tilt the angle of the rearview mirror so as to dim the glare intensity, adjustment of the side view mirror is more difficult, either requiring the driver to manually manipulate an adjustment lever or adjustment buttons.

Various devices have been proposed in the prior art for adjusting a rearview mirror in response to user actuation or in relation to a sensed light intensity. In addition, U.S. Pat. No. 5,993,013 proposes a side view mirror that is tilted to an antiglare position when an interior rearview mirror is also tilted to an antiglare position. Although assumably effective for their intended purposes, the existing proposals do not permit a driver to manually actuate a side mirror from between normal and anti-glare configurations without the rearview mirror being adjusted or for the side mirror to automatically shift between said configurations upon detecting glare.

Therefore, it would be desirable to have an automobile side mirror that may be tilted between normal and anti-glare configurations. Further, it would be desirable to have an automobile side mirror that is automatically actuated to tilt to the anti-glare configuration upon detection of a predetermined amount of light directed at the reflective portion of the mirror. In addition, it would be desirable to have a side mirror having a configuration in which a light sensor is protected from erroneously detecting light.

SUMMARY OF THE INVENTION

Accordingly, an automobile side mirror according to the present invention includes a reflective portion having a front mirror that is incompletely silvered and a rear mirror angularly offset from the front mirror, the rear mirror being fixed relative to the front mirror. The mirror includes a bracket hingedly coupled to the reflective portion and a solenoid hingedly coupled to the reflective portion to selectively move the reflective portion from a first configuration to a second configuration. The mirror includes a return element to return the reflective portion from the second configuration to the first configuration. A light sensor is positioned to detect an amount of light directed toward the reflective portion. A processor is in communication with the light sensor and in communication with the solenoid, the processor including programming to actuate the solenoid upon detection of a predetermined amount of light.

Therefore, a general object of this invention is to provide an automobile side mirror that may be conveniently and selectively adjusted to avoid glare from the lights of a trailing vehicle.

Another object of this invention is to provide an automobile side mirror, as aforesaid, that immediately adjusts its reflective configuration upon actuation of a user input switch within the vehicle interior.

Still another object of this invention is to provide an automobile side mirror, as aforesaid, that automatically adjusts the tilt configuration of the mirror upon sensing a predetermined amount of light.

Yet another object of this invention is to provide an automobile side mirror, as aforesaid, that senses both ambient light and light from other automobile traffic so as to avoid false actuation and adjustment of the mirror.

A further object of this invention is to provide an automobile side mirror, as aforesaid, in which the light sensors are inset so as to avoid reception of light from sources not indicative of vehicle lights that would cause glare.

A still further object of this invention is to automatically return the mirror to a normal reflecting configuration when undesirable reflected light is no longer detected.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a sectional view taken along line 4b-4b as in FIG. 4a;

DESCRIPTION OF THE PREFERRED EMBODIMENT

An automobile side mirror will now be described in detail with reference to FIG. 1 through FIG. 5 of the accompanying drawings. More particularly, an automobile side mirror 100 includes a reflective portion 110.

Figure 1:
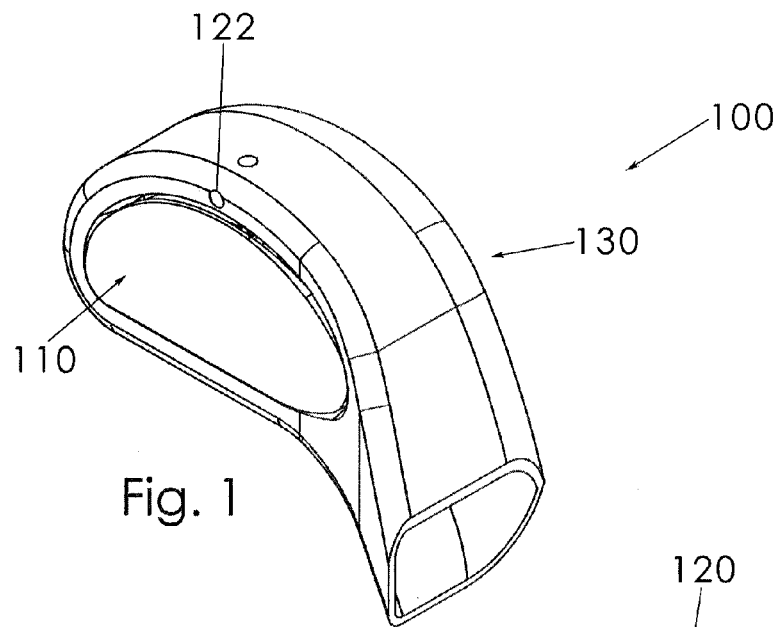
FIG. 1 is a front perspective view of an automobile side mirror according to a preferred embodiment of the present invention.
Figure 2:
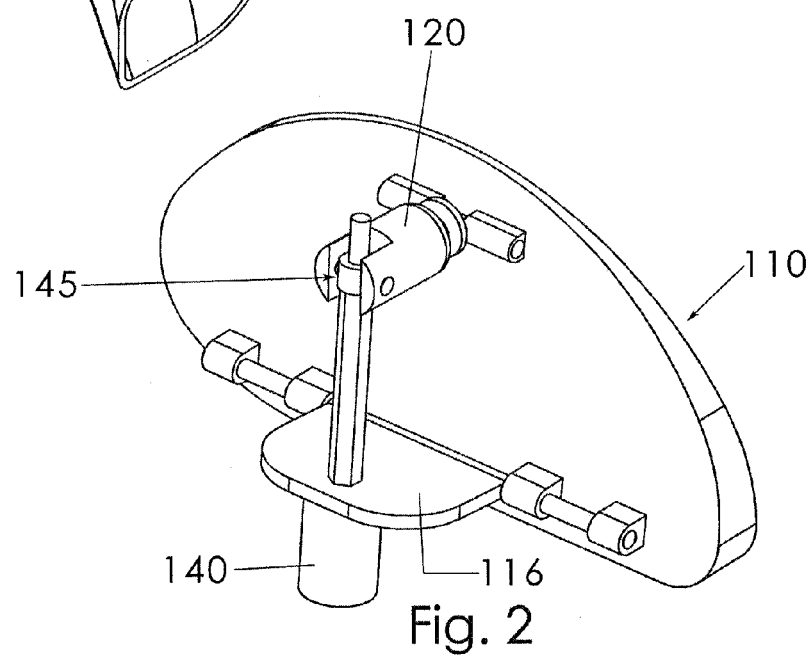
FIG. 2 is a rear perspective view of the side mirror as in FIG. 1 removed from the housing.
Figure 3A:
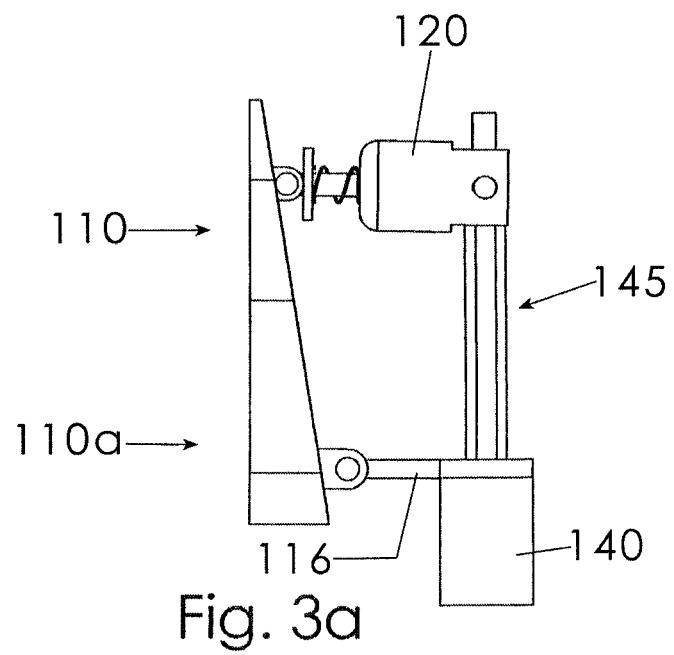
FIG. 3a is a side view of the mirror as in FIG. 2.
Figure 3B:
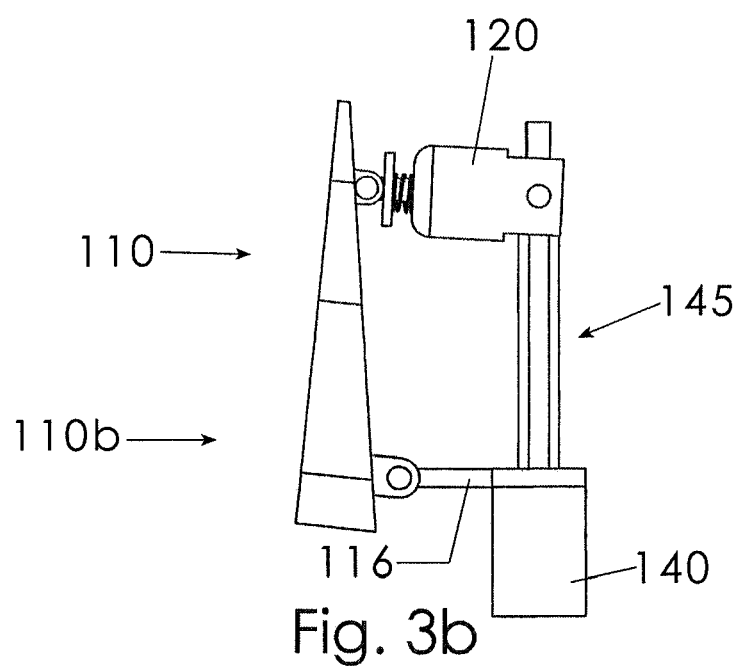
FIG. 3b is another side view of the side mirror as in FIG. 2 with the reflective portion in a second configuration.
Figure 4A:
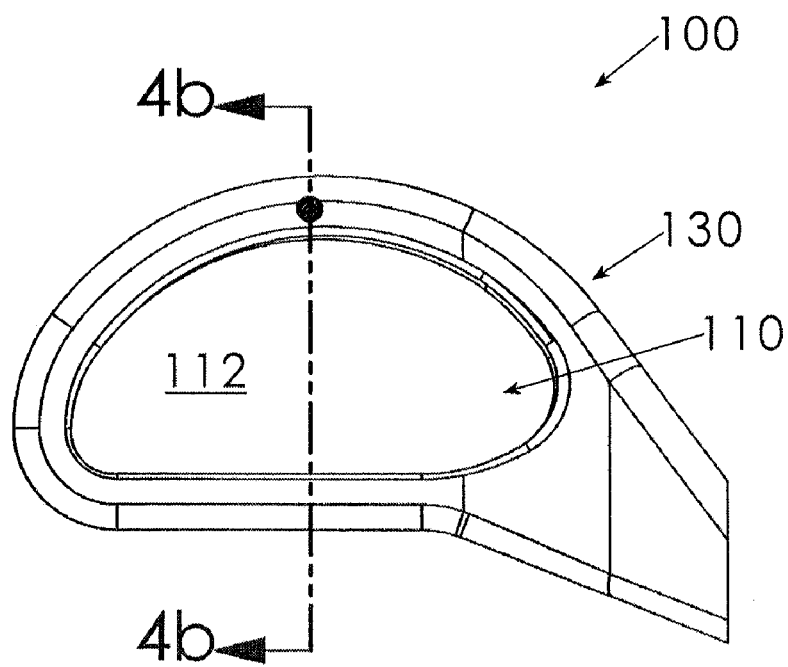
FIG. 4a is a front view of the side mirror as in FIG. 1.
Figure 4B:
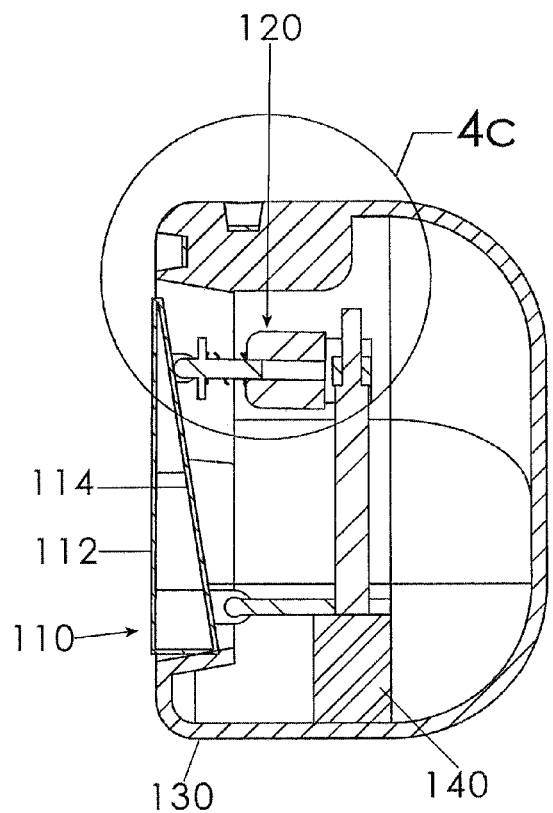

As shown in FIG. 4b, the reflective portion 110 has a front mirror 112 that is incompletely silvered and a rear mirror 114 that is angularly offset from the front mirror 112. The rear mirror 114 is fixed relative to the front mirror 112. As shown in FIG. 2, a bracket 116 is hingedly coupled to the reflective portion 110. A solenoid 120 is hingedly coupled to the reflective portion 110 to selectively move the reflective portion 110 from a first configuration 110a (FIG. 3a) to a second configuration 110b (FIG. 3b). A return element (e.g., a spring, etc.) is included to return the reflective portion 110 from the second configuration 110b (FIG. 3b) to the first configuration 110a (FIG. 3a). A housing 130 may enclose the reflective portion 110, the bracket 116, the solenoid 120 and the return element, as shown in FIGS. 1, 4a, and 4b.

Means are included for actuating the solenoid 120 to move the reflective portion 110 from the first configuration 110a (FIG. 3a) to the second configuration 110b (FIG. 3b). For example, a light sensor 122 (FIGS. 1, 4c, and 5) may be positioned to detect an amount of light directed toward the reflective portion 110, a processor 125 (FIG. 5) may be in communication with the light sensor 122 and the solenoid 120, and the processor 125 may include programming to actuate the solenoid 120 upon detection of a predetermined amount of light. The predetermined amount of light may be based solely on data from the light sensor 122, or the predetermined amount of light may be a relative value that represents a difference between: (a) an amount of ambient light detected by an ambient light sensor 124 that is in communication with the processor 125; and (b) an amount of light detected by the light sensor 122.

Figure 4C:
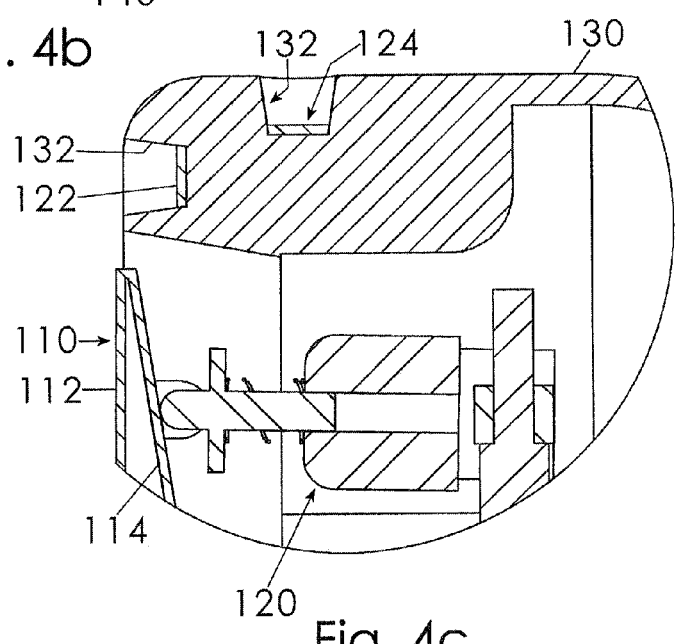
FIG. 4c is an isolated view on an enlarged scale taken from a portion of FIG. 4b.

To sense light from particular directions, the light sensor 122 and the ambient light sensor 124 may be inserted into respective conical depressions 132 (FIG. 4c) or otherwise be directionally focused. FIG. 4c shows the light sensor 122 insert into a respective conical depression 132 defined by the housing 130 adjacent the reflective portion 110, and the ambient light sensor 124 is shown insert into another conical depression 132 facing generally upwardly. The light sensor 122 and the ambient light sensor 124 may include, for example, at least one photodiode, phototransistor, or photoresistor. Additionally, or alternately, to the light sensor 122, a cabin switch 135 (FIG. 5) may be in communication with the processor 125 to selectively cause the processor 125 to actuate the solenoid 120.

Figure 5:
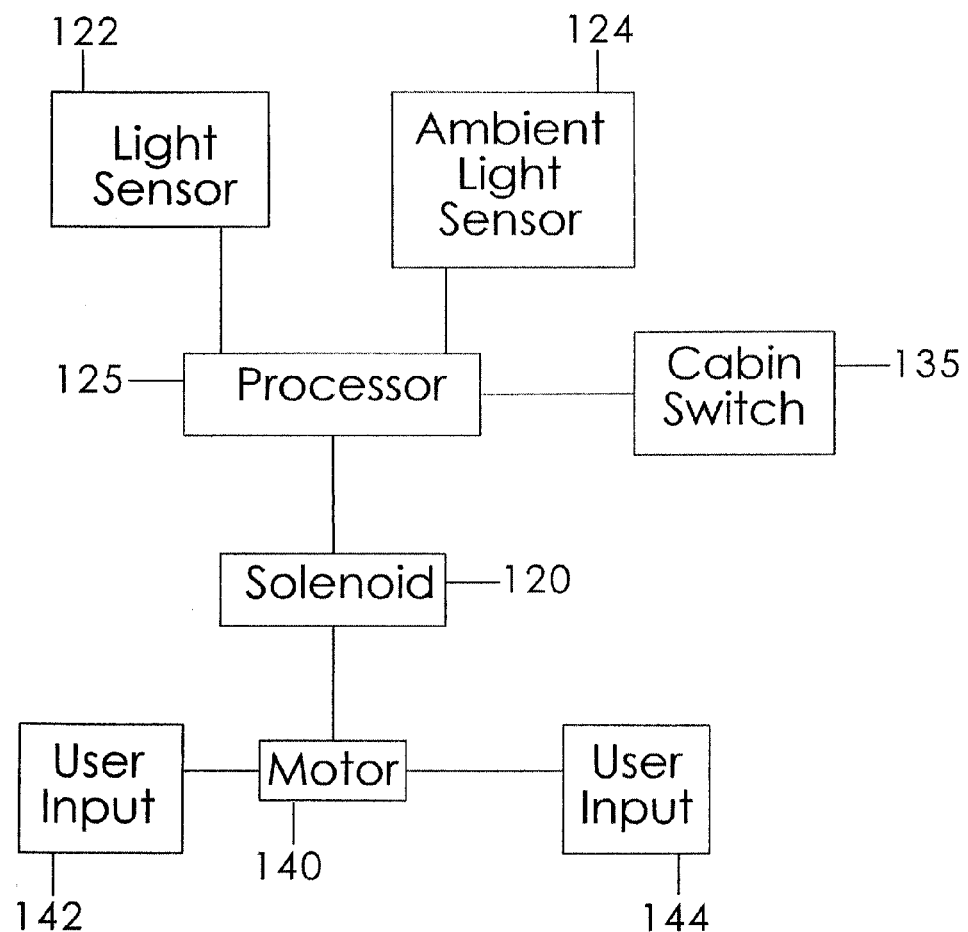
FIG. 5 is a block diagram of the electronic components of the side mirror.

Means may further be included for rotating the bracket 116 and/or the solenoid 120 to selectively turn the reflective portion 110 laterally and for raising and lowering the bracket 116 and/or the solenoid 120 to selectively tilt the reflective portion 110. For example, as shown in FIGS. 2 and 5, a motor 140 may be in communication with a user input 142 and operatively coupled to the bracket 116 to rotate the bracket 116 upon actuation by the user input 142, and rotation of the bracket 116 may turn the reflective portion 110 laterally. The motor 140 or another motor may be in communication with a user input 144 and be operatively coupled to the solenoid 120 to raise and lower the solenoid 120 to tilt the reflective portion 110. A lead screw 145 (FIG. 2) may operatively couple the motor 140 to the solenoid 120, and the solenoid 120 may be hingedly coupled to the lead screw 145. "Lead screw" is used herein to refer to lead screws, ball screws, and other mechanical devices that translation rotational motion to linear motion.

In use, a driver may position the reflective portion 110, such as by using input 142 to cause the reflective portion 110 to turn laterally (as set forth above) and using input 144 to cause the reflective portion 110 to tilt (as set forth above). In normal driving, then, the reflective portion 110 is at the first configuration 110a (FIG. 3a), and the driver views images appearing in the front mirror 112. To reduce glare, such as that caused by headlights of other vehicles at night, the reflective portion 110 may be moved from the first configuration 110a (FIG. 3a) to the second configuration 110b (FIG. 3b) so that the driver views images appearing in the rear mirror 114.

As set forth above, the processor 125 may automatically cause the solenoid 120 to move the reflective portion 110 to the second configuration 110b after a predetermined amount of light is detected, or the cabin switch 135 may be used to cause the solenoid 120 to move the reflective portion 110 to the second configuration 110b. The return element may then cause the reflective portion 110 to return to the first configuration 110a after the predetermined amount of light is no longer detected or the processor 125 receives a different signal from the cabin switch 135. In other words, the processor 125 may include programming that deactivates or directs the solenoid 120 to release its actuation so as to allow the reflective portion 110 to return to the first configuration when the predetermined amount of light is no longer detected.

It is understood that while certain forms of this invention have been illustrated and described, it is not limited thereto except insofar as such limitations are included in the following claims and allowable functional equivalents thereof.

The invention claimed is:

1. An automobile side mirror, comprising:
  a reflective portion having:
    a front mirror incompletely silvered so as to reflect images to a driver of the automobile during daylight hours;
    a rear mirror fixedly attached to said front mirror in an angularly offset configuration;
  a bracket hingedly coupled to a first pivot point adjacent a lower edge of said reflective portion;
  a solenoid hingedly coupled to a second pivot point adjacent an upper edge of said reflective portion to selectively tilt said reflective portion from a first configuration at which said front mirror is in a generally vertical configuration with respect to said bracket to a second configuration at which said front mirror is generally inclined with respect to said bracket when actuated;
  a lead screw extending upwardly from said bracket, said solenoid being hingedly coupled to said lead screw such that said solenoid is positioned rearwardly of said reflective portion rear mirror;
  wherein:
    said rear mirror is angularly offset relative to said front mirror at both said first and second configurations;
  a return element to return said reflective portion from said second configuration to said first configuration;
  a light sensor positioned to detect an amount of light directed toward said reflective portion;
  a processor in communication with said light sensor and in communication with said solenoid;
  an ambient light sensor in communication with said processor, and wherein said amount of light is a relative value that represents a difference between said amount of ambient light detected by said ambient light sensor and said amount of light detected by said light sensor;
  programming in said processor to actuate said solenoid if said amount of light is greater than a predetermined amount of light; and
  programming in said processor for deactivating said solenoid when said predetermined amount of light is no longer detected such that said return element returns said reflective portion from said second configuration to said first configuration immediately when said predetermined amount of light is no longer detected;
  a housing enclosing said reflective portion, said bracket, said solenoid, and said return element; wherein:
    said housing is configured to attach to a side door of the automobile;
    said housing defines a conical depression adjacent said reflective portion that faces rearwardly;
    said light sensor is inset into said conical depression and faces rearwardly;
    said housing defines another conical depression that faces upwardly; and
    said ambient light sensor is inset into said another conical depression.

2. The automobile side mirror of claim 1, further comprising:
  a first motor in communication with a user input and being operatively coupled to said lead screw to rotate said lead screw upon actuation by said user input, whereby turning said reflective portion laterally; and
  wherein either said first motor or a second motor is in communication with a user input and is operatively coupled to said solenoid to raise and lower said solenoid to tilt said reflective portion.

3. The automobile side mirror of claim 1, further comprising a cabin switch in communication with said processor to selectively cause said processor to actuate said solenoid.

* * * * *